(12) United States Patent
Liu et al.

(10) Patent No.: US 10,989,796 B2
(45) Date of Patent: Apr. 27, 2021

(54) LIDAR RANGING METHOD, DEVICE, COMPUTER APPARATUS AND STORAGE MEDIUM

(71) Applicant: SUTENG INNOVATION TECHNOLOGY CO., LTD., Shenzhen (CN)

(72) Inventors: Xia Liu, Shenzhen (CN); Han Hu, Shenzhen (CN); Zhiyi Lou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/023,307

(22) Filed: Sep. 16, 2020

(65) Prior Publication Data
US 2021/0072361 A1 Mar. 11, 2021

Related U.S. Application Data

(63) Continuation of application No. PCT/CN2019/104755, filed on Sep. 6, 2019.

(51) Int. Cl.
*G01S 7/487* (2006.01)
*G01S 17/10* (2020.01)

(52) U.S. Cl.
CPC ............ *G01S 7/4873* (2013.01); *G01S 17/10* (2013.01)

(58) Field of Classification Search
CPC ........ G01S 7/487; G01S 7/4873; G01S 17/10; G01S 17/26
See application file for complete search history.

(56) References Cited

U.S. PATENT DOCUMENTS

| 2017/0016981 | A1* | 1/2017 | Hinderling | G01S 17/42 |
| 2018/0239005 | A1* | 8/2018 | Dussan | G01S 7/487 |
| 2019/0049583 | A1* | 2/2019 | Xu | G01S 7/487 |

* cited by examiner

*Primary Examiner* — Eric L Bolda
(74) *Attorney, Agent, or Firm* — Bayes PLLC

(57) ABSTRACT

The present disclosure provides, for example, a lidar ranging method. The method may include calling a sequencer to generate a preset sequence with the sequencer. The method may also include determining a pulse transmission interval of double pulses according to the preset sequence and a preset value. The method may further include transmitting a probing signal to an object to be ranged according to the pulse transmission interval of the double pulses. The method may additionally include receiving, from the object to be ranged, an echo signal returned according to the probing signal. The method may also include extracting a valid echo signal from the echo signal. The method may further include calculating a distance from the object to be ranged according to a time difference between the valid echo signal and the probing signal.

17 Claims, 6 Drawing Sheets

LIDAR RANGING METHOD, DEVICE, COMPUTER APPARATUS AND STORAGE MEDIUM

CROSS-REFERENCE TO RELATED APPLICATION

The present application is a bypass continuation of, and claims the priority of, PCT/CN2019/104755, filed Sep. 6, 2019, the entirety of which is hereby incorporated herein by reference.

TECHNICAL FIELD

The present application relates to a lidar ranging method, device, computer apparatus and storage medium.

BACKGROUND

At present, a lidar transmits a probing signal to an object to be ranged, receives an echo signal reflected from the object to be ranged, and calculates a distance between the object to be ranged and the lidar according to a time difference between the echo signal and the probing signal. When a plurality of vehicles each equipped with a lidar of the same type operate in the same area at the same time, lidars equipped on each vehicle may receive probing signals transmitted from lidars equipped on other vehicles, resulting in interference among these lidars. For example, a probing signal transmitted by a first lidar is reflected by an object to be ranged, and then is detected by a second lidar which in turn generates an echo signal; as such, interference to the second lidar by the first lidar occurs.

SUMMARY

According to various embodiments disclosed in the present application, there is provided a lidar ranging method, device, computer apparatus, and storage medium that can improve ranging accuracy of a lidar by effectively avoiding mutual interference between lidars.

A lidar ranging method comprises:

Calling a sequencer to generate a preset sequence with the sequencer;

Determining a pulse transmission interval of double pulses according to the preset sequence and a preset value;

Transmitting a probing signal to an object to be ranged according to the pulse transmission interval of the double pulses;

Receiving, from the object to be ranged, an echo signal returned according to the probing signal, extracting a valid echo signal from the echo signal; and Calculating a distance from the object to be ranged according to a time difference between the valid echo signal and the probing signal.

A lidar ranging device comprises:

A generating module, which is configured for calling a sequencer to generate a preset sequence with the sequencer;

A determining module, which is configured for determining a pulse transmission interval of double pulses according to the preset sequence and a preset value;

A transmitting module, which is configured for transmitting a probing signal to an object to be ranged according to the pulse transmission interval of the double pulses;

An extracting module, which is configured for receiving, from the object to be ranged, an echo signal returned according to the probing signal and extracting a valid echo signal from the echo signal; and A calculating module, which is configured for calculating a distance from the object to be ranged according to a time difference between the valid echo signal and the probing signal.

A computer apparatus, comprising a memory having computer-readable instructions stored thereon; and one or more processors; wherein the computer-readable instructions, when being executed by the one or more processors, cause the one or more processors to perform the following steps:

Calling a sequencer to generate a preset sequence with the sequencer;

Determining a pulse transmission interval of double pulses according to the preset sequence and a preset value;

Transmitting a probing signal to an object to be ranged according to the pulse transmission interval of the double pulses;

Receiving, from the object to be ranged, an echo signal returned according to the probing signal; extracting a valid echo signal from the echo signal; and Calculating a distance from the object to be ranged according to a time difference between the valid echo signal and the probing signal.

For one or more non-volatile computer-readable storage media storing computer-readable instructions, when the computer-readable instructions are executed by one or more processors, the one or more processors perform the following steps:

Calling a sequencer to generate a preset sequence with the sequencer;

Determining a pulse transmission interval of double pulses according to the preset sequence and a preset value;

Transmitting a probing signal to an object to be ranged according to the pulse transmission interval of the double pulses;

Receiving, from the object to be ranged, an echo signal returned according to the probing signal; extracting a valid echo signal from the echo signal; and Calculating a distance from the object to be ranged according to a time difference between the valid echo signal and the probing signal.

The details of one or more embodiments of the present application are set forth in the drawings and description below. Other features and advantages of the present application will become apparent from the description, drawings, and claims.

BRIEF DESCRIPTION OF THE DRAWINGS

In order to more clearly explain the technical solutions in the embodiments of the present application, the drawings to be used with the embodiments will be briefly described in the following. It is apparent that the drawings referred to in the following description are merely some of the embodiments of the present application. Based on these drawings, those of ordinary skill in the art can derive other drawings without creative efforts.

DETAILED DESCRIPTION

In order to further clarify the technical solutions and advantages of the present application, the following detailed description of the present application is made with reference to the accompanying drawings and embodiments. It should be understood that the specific embodiments described herein are only used to explain the present application, and are not used to limit the present application.

Figure 1:
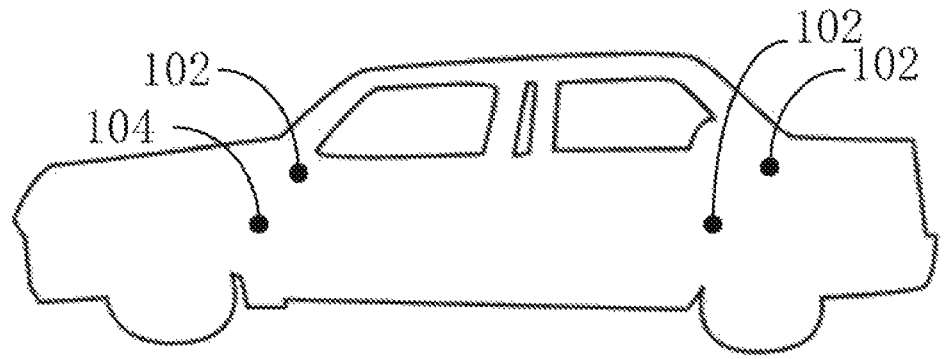
FIG. 1 is an application scenario diagram of a lidar ranging method according to one or more embodiments.

The lidar ranging method provided in this application can be applied in the application environment shown in FIG. 1. Before detecting an object to be ranged, a lidar 102 calls a sequencer via a computer apparatus 104 and generates a preset sequence with the sequencer. The computer apparatus 104 determines a pulse transmission interval of double pulses according to the preset sequence and a preset value. The computer apparatus 104 sends the pulse transmission interval of double pulses to the lidar 102, and the lidar 102 transmits a probing signal according to the pulse transmission interval of double pulses. The lidar 102 receives from the object to be ranged the echo signal returned according to the probing signal, and sends it to the computer apparatus 104. The computer apparatus 104 extracts a valid echo signal from the echo signal, and calculates a distance from the object to be ranged according to a time difference between the valid echo signal and the probing signal.

Figure 2:
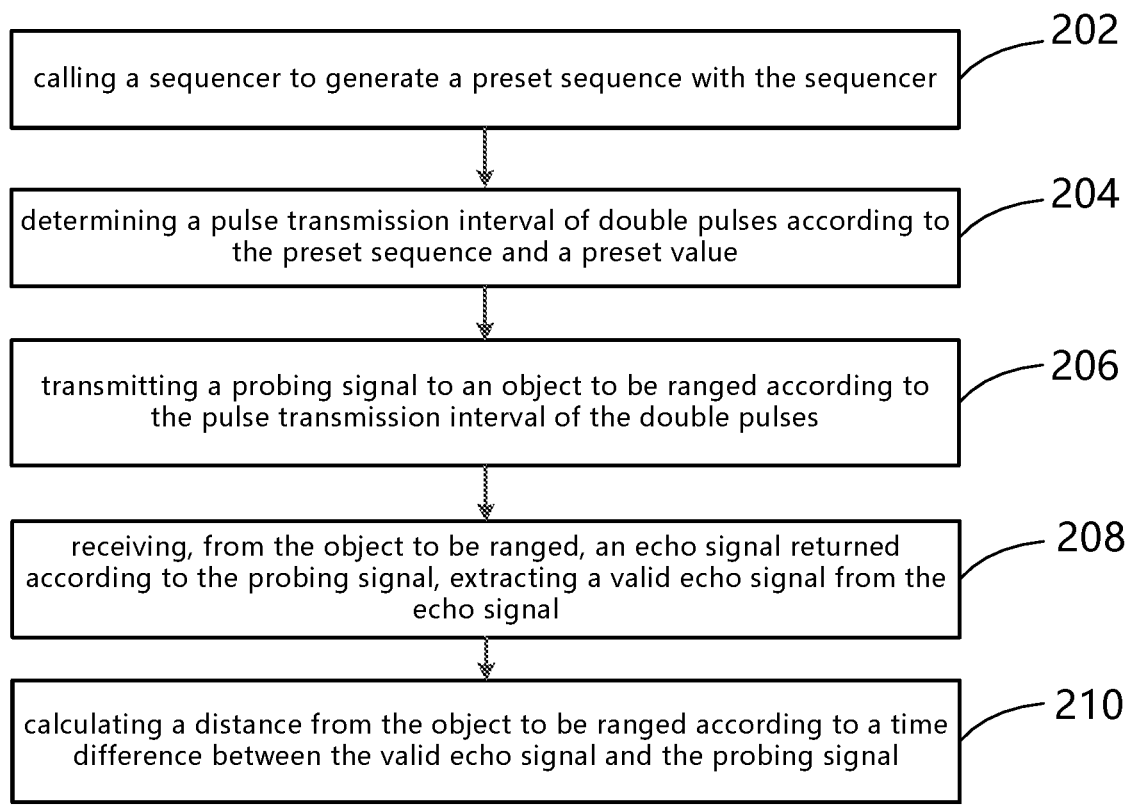
FIG. 2 is a schematic flowchart of a lidar ranging method according to one or more embodiments.

In one of the embodiments, as shown in FIG. 2, a lidar ranging method is provided. Take the method applied to the computer apparatus in FIG. 1 as an example for description, comprising the following steps:

At step 202: calling a sequencer to generate a preset sequence with the sequencer.

The vehicle is pre-installed with a computer apparatus and a lidar. The computer apparatus can communicate with the lidar and receive radar signals transmitted from the lidar. The lidar may be a lidar adopting a double pulse mode. The computer apparatus calls a sequencer and generates a preset sequence with the sequencer. The sequencer may be an m-sequencer. The m-sequencer may be an n-level shift register, and a length of a preset sequence generated by the m-sequencer may be determined by n. The length of the preset sequence may be $2^{n-1}$, and the longest period of the preset sequence may be $2^{n-1}$. For example, the computer apparatus may set n to 8 in advance, the shift register is A=[a7, a6, a5 . . . a0], and the initial value may be A=00000001. The preset sequence may be the original m-sequence generated by the m-sequencer. For example, when the m-sequencer is a Level-8 shift register, the shift register is A=[a7, a6, a5 . . . a0], and the period of the preset sequence is 255. The sequencer can use a primitive polynomial to generate a preset sequence. The primitive polynomial may be $f=1+x^2+x^3+x^4+x^8$.

At step 204: determining a pulse transmission interval of double pulses according to the preset sequence and a preset value.

Figure 8:
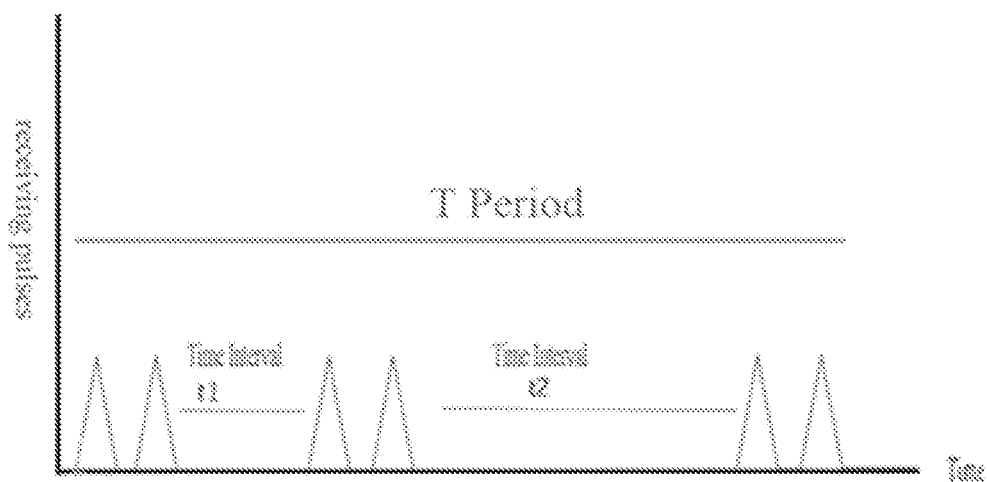
FIG. 8 illustrates timing of pulses according to certain embodiments of the present disclosure.

The computer apparatus acquires a preset value preconfigured in the lidar. The preset value may be the value of the n-level register, which may be a fixed value. Preset values of multiple lidars can be set to different values. The number of levels of the n-level register and the number of levels of the sequencer may be the same. For example, the computer apparatus can be set n to 8 in advance. At this time, the sequencer is A=[a7, a6, a5 . . . a0], and the Level-8 fixed register is B=[b7, b6, b5 b0]. The computer apparatus may calculate a frequency hopping sequence corresponding to the preset sequence, according to the preset sequence and the preset value. When the preset values are different, the acquired frequency hopping sequences may also be different. The frequency hopping sequence may be an address code that controls the frequency hopping of the signal to be transmitted. For example, the frequency hopping sequence may be RS (Reed-Solomon) sequence. The computer apparatus divides the time range of the double pulses according to the preset sequence (see FIG. 8 for example). The computer apparatus may divide the time range of double pulses into a plurality of transmission time intervals according to a period of preset sequence. And then the computer apparatus selects a pulse transmission interval of the double pulses from the divided plurality of transmission time intervals according to the frequency hopping sequence.

At step 206, transmitting a probing signal to an object to be ranged according to the pulse transmission interval of the double pulses.

After the computer apparatus selects the pulse transmission interval corresponding to the double pulses, it may determine the probing signal according to the pulse transmission interval corresponding to the signal to be transmitted. Specifically, the computer apparatus may determine the pulse transmission time of double pulses according to the preset sequence and the pulse transmission interval corresponding to the signal to be transmitted. The computer apparatus sends the pulse transmission time of double pulses to a transmitter of the lidar, and controls the transmitter of the lidar to transmit a probing signal according to the pulse transmission time of double pulses. The probing signal may be a probing signal for detecting the object to be ranged.

Further, after the computer apparatus transmits the probing signal via the lidar, it may send the pulse transmission time of double pulses to a receiver of the lidar. The computer apparatus can implement via the receiver of the lidar an operation of synchronization between signal transmitting and signal receiving, according to the pulse transmission time of the double pulses.

At step 208: receiving, from the object to be ranged, an echo signal returned according to the probing signal, and extracting a valid echo signal from the echo signal.

At step 210: calculating a distance from the object to be ranged according to a time difference between the valid echo signal and the probing signal.

When the probing signal transmitted by the lidar encounters the object to be ranged, a part of the signal will be reflected to the receiver of the lidar. The computer apparatus receives the echo signal sent from the receiver of the lidar, and then the computer apparatus may extract the valid echo signal from the echo signal.

In one of the embodiments, extracting the valid echo signal from the echo signal comprises: identifying, from the echo signal, a pulse transmission interval corresponding to the probing signal; decoding the echo signal according to the pulse transmission interval corresponding to the probing signal, to acquire a decoded signal; and performing signal detection on the decoded signal to acquire the valid echo signal.

After the computer apparatus receives the echo signal corresponding to the probing signal, it may perform signal identification and signal detection on the echo signal. The computer apparatus identifies the pulse transmission interval of the probing signal in the echo signal, and then the computer apparatus decodes the echo signal according to the pulse transmission interval of the identified probing signal. The computer apparatus performs signal detection on the decoded echo signal. The signal detection may be threshold detection, wherein a threshold may be a signal-to-noise ratio of the echo signal at which a threshold effect begins to occur. The signal-to-noise ratio may be a parameter of the proportional relationship between an effective component and a noise component in the echo signal.

After signal detection, the computer apparatus may acquire the valid echo signal, and further calculate a distance from the object to be ranged according to a time difference between the valid echo signal and the probing signal. Specifically, the computer apparatus may divide the valid echo signal into two ways of signals to acquire a first-way signal and a second-way signal, and then calculate a time difference between the valid echo signal and the probing signal. The computer apparatus selects a corresponding waveform according to points corresponding to the valid echo signal, so as to acquire the first-way signal. The computer apparatus delays the first signal and amplifies the delayed first signal to acquire the second-way signal. The computer apparatus acquires a target curve by executing a subtraction between the first-way signal and the second-way signal. The target curve may be a curve derived according to the difference between the signal amplitude of the first-way signal and the signal amplitude of the second-way signal. And then the computer apparatus determines the time difference between the valid echo signal and the probing signal according to the intersection of the target curve and the abscissa axis. The first-way signal may be an attenuated signal, and the second-way signal may be a delayed signal. For example, the valid echo signal extracted by the computer apparatus may be the Qth point, while 7 points before the Qth point and 8 points after the Qth point are selected. Then, the corresponding waveform is selected according to the selected points to acquire the attenuated signal. The computer apparatus delays the attenuated signal by one point and amplifies it by 1.25 times to acquire the delayed signal. The computer apparatus acquires the target curve by subtraction between the attenuated signal and the delayed signal. The computer apparatus determines the time difference between the valid echo signal and the probing signal according to the intersection of the target curve and the abscissa axis. After deriving the time difference between the valid echo signal and the probing signal, the computer apparatus derives the distance from the object to be ranged according to the time difference and light velocity.

By dividing the valid echo signal into two ways of signals, calculating the delay time of the valid echo signal according to the difference between the two ways of signals, and further calculating the distance from the object to be ranged; the computer apparatus reduces time jitter, effectively improves the timing accuracy, and improves the accuracy of ranging.

In this embodiment, by generating a preset sequence with the sequencer, and determining the pulse transmission interval corresponding to the double pulses according to the preset sequence and the preset value, the computer apparatus improves the auto-correlation performance and cross-correlation performance between the probing signals. By transmitting the probing signal to the object to be ranged according to the pulse transmission interval corresponding to the double pulses, the computer apparatus is able to adjust the pulse transmission interval of the double pulses of the lidar so as to differentiate and process probing signals of multiple lidars. As such, when multiple lidars work together, multi-lidar interference is effectively avoided, and the distance from the object to be ranged is calculated according to the time difference between the valid echo signal and the probing signal, thereby improving the ranging accuracy of the lidar.

Figure 3:
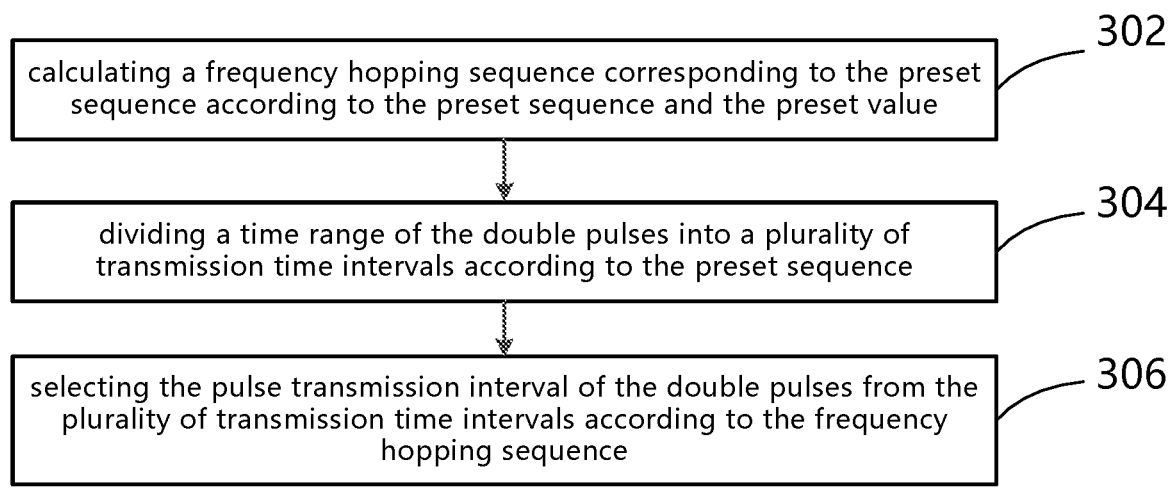
FIG. 3 is a schematic flowchart of step for determining a pulse transmission interval of double pulses according to the preset sequence and a preset value in one or more embodiments.

In one of the embodiments, as shown in FIG. 3, the above method further comprises a step of determining a pulse transmission interval of double pulses according to the preset sequence and a preset value, which specifically comprises:

At step 302: calculating a frequency hopping sequence corresponding to the preset sequence according to the preset sequence and the preset value.

At step 304: dividing a time range of the double pulses into a plurality of transmission time intervals according to the preset sequence.

At step 306: selecting a pulse transmission interval of the double pulses from the plurality of transmission time intervals according to the frequency hopping sequence.

Figure 7:
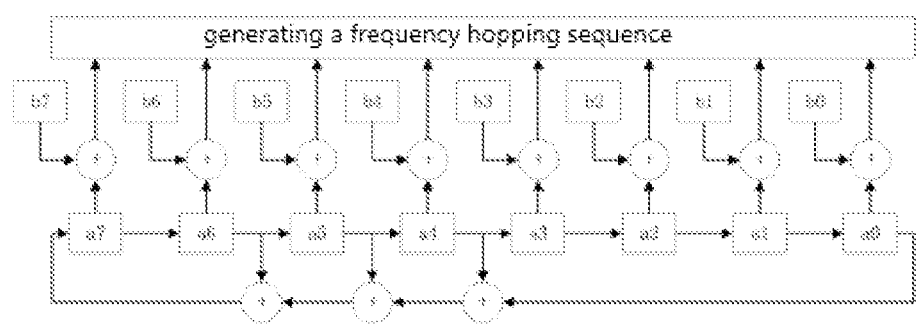
FIG. 7 is a schematic view of a calculation of a computer apparatus according to one or more embodiments.

The computer apparatus calculates a frequency hopping sequence corresponding to the preset sequence, according to the preset sequence and the preset value. The preset sequence may be an original m-sequence generated by the m-sequencer. The preset value may be a value of an n-level fixed register. The frequency hopping sequence may be an address code that controls frequency hopping of the signal to be transmitted. The computer apparatus inputs the preset sequence and the preset value into an adder for calculation, and acquires a frequency hopping sequence corresponding to the preset sequence. Preset values for multiple lidars can be set to different values, where one preset value may represent one type of frequency hopping sequence, and one type of frequency hopping sequence corresponds to one set of frequency hopping patterns. The computer apparatus inputs the preset sequence and the preset value into an adder for calculation, and acquires a frequency hopping sequence corresponding to the preset sequence. The adder may be a modulo-two adder. The computer apparatus performs a modulo-two addition operation on the bits corresponding to the preset sequence and the preset value via the adder, to acquire a frequency hopping sequence corresponding to the preset sequence. For example, the computer apparatus may set n to 8 in advance, the sequencer is A=[a7, a6, a5 a0], and the preset value of Level-8 fixed register is B=[b7, b6, b5 b0]. A schematic view of the calculation of the computer apparatus on the frequency hopping sequence corresponding to the preset sequence according to the preset sequence and the preset value may be as shown in FIG. 7.

After the computer apparatus acquires the frequency hopping sequence, it divides the time range of double pulses into a plurality of transmission time intervals according to the preset sequence. The computer apparatus calculates the period of the preset sequence according to the number of levels of the sequencer, and divides the time range of the double pulses according to the period of the preset sequence. The time range may be a time interval of the double pulses, for example, the lidar may preset n to be 8, and then the period of the preset sequence is 255. The time range can be 5-15 s. The length of the time range is 10 s. The computer apparatus can divide the time range for the lidar to transmit double pulses into 255 transmission time intervals. The length of each transmission time interval is 10/255 s. When the computer apparatus acquires the frequency hopping sequence, the frequency hopping sequence will output a value, which may be any value between 1 to 255. The computer apparatus selects from the multiple transmission time intervals a pulse transmission interval corresponding to the signal to be transmitted, according to the value output by the frequency hopping sequence.

In this embodiment, the computer apparatus divides the time range of the double pulses into multiple transmission time intervals according to the preset sequence, and selects the pulse transmission interval corresponding to the double pulses according to the frequency hopping sequence acquired via calculation. The pulse transmission interval selected and acquired according to the frequency hopping sequence can be used to adjust the pulse transmission time of the double pulses, and to further adjust the transmission waveform, and to further effectively avoid mutual interference between multiple lidars.

Figure 4:
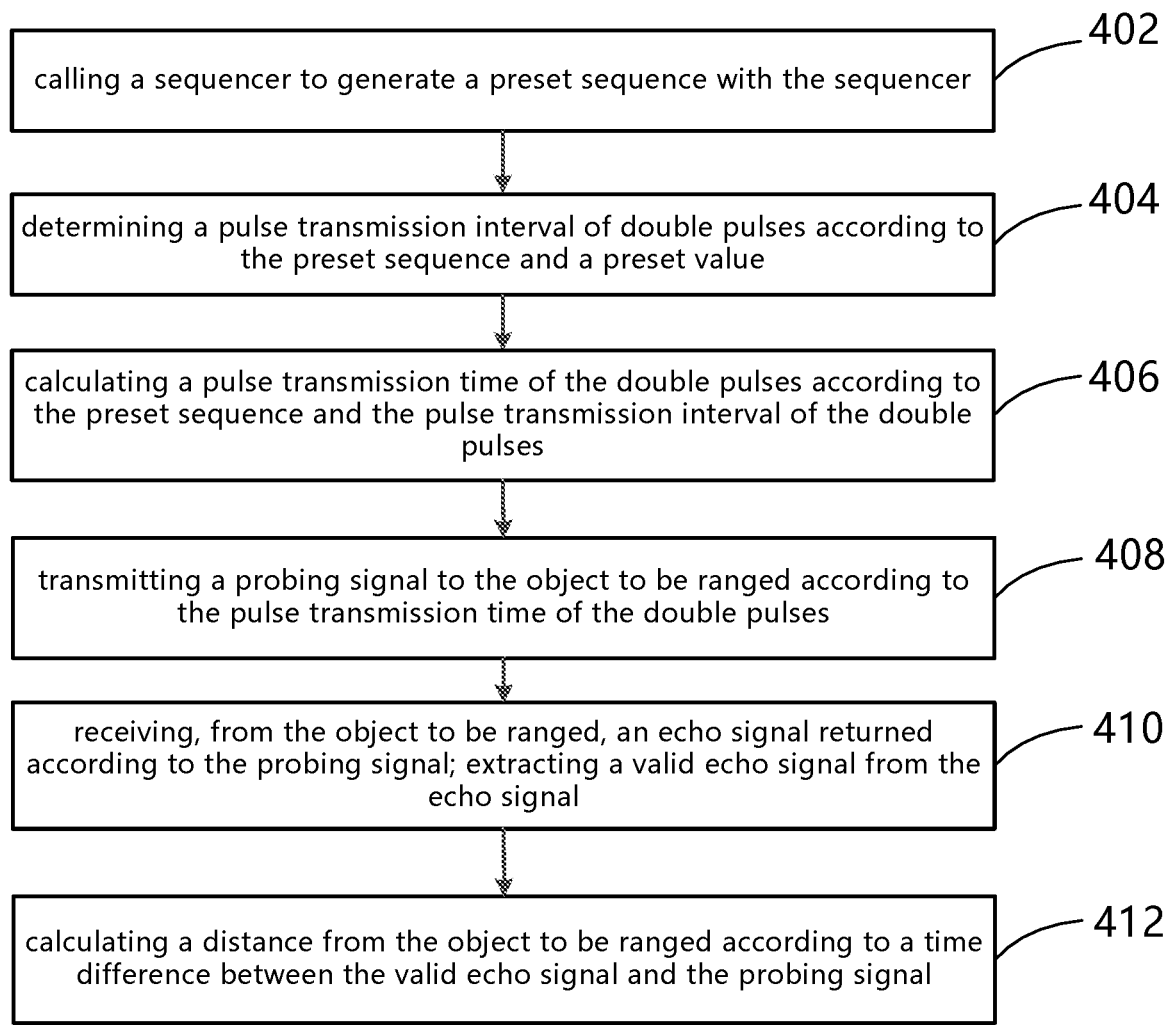
FIG. 4 is a schematic flowchart of a lidar ranging method in another embodiment.

In one of the embodiments, as shown in FIG. 4, a lidar ranging method is provided. Take the method applied to the computer apparatus as an example for illustration, which comprises the following steps:

At step 402: calling a sequencer to generate a preset sequence with the sequencer.

At step 404: determining a pulse transmission interval of double pulses according to the preset sequence and a preset value.

At step 406: determining pulse transmission time of the double pulses according to the preset sequence and the pulse transmission interval of the double pulses.

At step 408, transmitting a probing signal to an object to be ranged according to the pulse transmission time of the double pulses.

At step 410: receiving, from the object to be ranged, an echo signal returned according to the probing signal, and extracting a valid echo signal from the echo signal.

At step 412: calculating a distance from the object to be ranged according to a time difference between the valid echo signal and the probing signal.

After calculating the pulse transmission interval of the double pulse according to the preset sequence and the preset value, the computer apparatus determines the pulse transmission time of the double pulses according to the preset sequence and the pulse transmission interval of the double pulses. When the computer apparatus acquires the frequency hopping sequence, the frequency hopping sequence will output a value, which may be any value between 1 to 255. The computer apparatus selects a pulse transmission interval of the double pulses from the multiple transmission time intervals according to the value output by the frequency hopping sequence. The computer apparatus determines the pulse transmission time of the double pulses according to the selected pulse transmission interval. For example, the lidar may preset n to be 8, and then the period of the preset sequence is 255. The time range can be 5-15 s. The length of the time range is 10 s. Accordingly, the computer apparatus can divide the time range corresponding to the double pulses of the lidar into 255 transmission time intervals, where the length of each transmission time interval is 10/255 s. If the value output by the frequency hopping sequence is 6, then the pulse transmission time of the double pulses can be 5+6*(10/255)s.

The computer apparatus sends the pulse transmission time of the double pulses to the lidar, and the probing signal is transmitted from the lidar according to the pulse transmission time of the double pulses. The receiver of the lidar receives an echo signal of the probing signal reflected from the object to be ranged, and the computer apparatus receives the echo signal sent from the lidar. The echo signal may comprise an interference signal and a valid echo signal, where the interference signal may comprise a false echo signal. The computer apparatus extracts the valid echo signal from the echo signal. The way of extracting the valid echo signal may comprise signal identification and signal detection. The signal identification may be to identify the pulse transmission interval of the probing signal from the echo signal, and then the computer apparatus decodes the echo signal according to the identified pulse transmission interval of the probing signal. The computer apparatus performs the signal detection on the decoded echo signal. The signal detection may be threshold detection. After performing the signal detection, the computer apparatus may acquire the valid echo signal, and then calculate the distance from the object to be ranged according to the valid echo signal.

In this embodiment, the computer apparatus generates a preset sequence with the sequencer, and determines the pulse transmission interval of the double pulses according to the preset sequence and the preset value, accordingly, the computer apparatus is able to realize adjustment of the transmission interval of the probing signal. The computer apparatus determines the pulse transmission time of the double pulses according to the preset sequence and the pulse transmission interval of the double pulses, and thus determines the probing signal for transmitting. It is also possible to process the time ranges of double pulses of multiple lidars differently; therefore, when multiple lidars work together, the anti-interference ability among multiple lidars can be improved more effectively, thereby effectively improving the detection accuracy of lidar.

In one of the embodiments, extracting a valid echo signal from the echo signal comprises: performing analog-to-digital conversion of the echo signal to acquire a corresponding digital signal; caching the digital signal; extracting a digital signal from a preset neighborhood when a number of cached digital signals reaches a preset number; performing a non-coherent integration on the extracted digital signal, outputting an integrated digital signal; and identifying the valid echo signal from the integrated digital signal.

The echo signal received by the computer apparatus may comprise a false echo signal. In order to reduce the effect of false echo signals on valid echo signals, the non-coherent integration can be performed on the echo signal. Specifically, the computer apparatus may first perform the analog-to-digital conversion on the echo signal, and cache the converted digital signal. The computer apparatus may cache the received multiple echo signals, wherein transmission angles between the multiple echo signals may be different. When the number of digital signals cached by the computer apparatus reaches a preset number, the digital signal in a preset spatial neighborhood can be extracted. For example, a size of the preset spatial neighborhood may be 3*3, and the number of times of extraction of the digital signal is 9 times. After extracting the digital signal, the computer apparatus reads the extracted digital signal in the form of a data stream, and performs the non-coherent integration on the extracted digital signal. The computer apparatus can also perform signal detection for the echo signal first, and then perform non-coherent integration on the echo signal after the signal detection. For example, the digital signal is extracted for 9 times, then the non-coherent integration formula can be as follows:

$$y[n] = \Sigma_{i=1}^{9} x_i[d], d \in [1:L]$$

Wherein, y represents the integrated echo signal, d represents the signal length of the digital signal with the value range of 1-L, i represents the number of times of the digital signal, and L represents the data length of the echo signal.

In this embodiment, the computer apparatus can effectively suppress the amplitude of the false echo signal after non-coherent integration on the extracted digital signal, and extract the valid echo signal from the integrated digital signal, so that the valid echo signal can be extracted more accurately, and the ranging accuracy of the lidar can be improved.

In one of the embodiments, performing signal detection on the decoded signal comprises: storing the decoded signal in a preset queue; extracting a signal to be inputted from the preset queue and inputting it to a buffer area; selecting an area signal from the buffer area according to a preset area; calculating a signal threshold corresponding to the decoded signal according to the area signal; comparing the decoded signal with the signal threshold to acquire a comparison result; and selecting from the comparison result a decoded signal larger than the signal threshold as the valid echo signal.

The computer apparatus can perform filtering process on each decoded signal. The filtering process may be to remove the DC component with a high-pass filter. The computer apparatus stores a plurality of filtered decoded signals in a queue, extracts the target decoded signal from the queue, and inputs it to the buffer area. A sequential order for the extraction may be determined according to the sequential order for acquiring the decoded signal after the filtering process. The computer apparatus selects an area signal corresponding to the preset area from the buffer area. The preset area may be a rear portion of the buffer area. The preset area may be calculated according to the number of times of the decoded signal after the filtering process and the number of signal points. The number of times of the decoded signal after the filtering process and the number of signal points can be determined based on historical experience. The computer apparatus may first select the number of times of the filtered decoded signal in the buffer area, and then select the number of signal points from rear portions of multiple filtered decoded signals. For example, if a decoded signal which has been filtered for 32 times is selected from the buffer area, and then 32 signal points are selected from a rear portion of the decoded signal filtered for 32 times, then the size of the preset area may be 32*32.

The computer apparatus may calculate a signal threshold corresponding to the decoded signal according to the selected area signal. After calculating the signal threshold, the computer apparatus can compare the decoded signal with the square root of the signal threshold, and use a decoded signal larger than the square root of the signal threshold as the valid echo signal. The computer apparatus can then calculate the distance from the object to be ranged based on the valid echo signal and the light velocity.

In this embodiment, the computer apparatus selects the area signal from the buffer area according to the preset area, and then calculates the signal threshold, which can monitor the environmental noise in real time and calculate the signal threshold based on the environmental noise, thereby effectively improving the detection accuracy of the lidar.

In one of the embodiments, calculating a signal threshold corresponding to the decoded signal according to the area signal comprises: calculating, according to the area signal, a corresponding noise power; calculating, according to the area signal and a preset false alarm probability value, a corresponding threshold factor; and calculating the signal threshold corresponding to the decoded signal according to the noise power and the threshold factor.

The computer apparatus can calculate the corresponding noise power according to the selected area signal. The calculation formula of noise power can be as follows:

$$Pn = \frac{1}{N}\sum_{h=1}^{N} x_h$$

Wherein, Pn represents the noise power, N represents the number of signal points, h represents the number of times of the echo signal, and Xh represents the square of the echo signal.

After acquiring the noise power, the computer apparatus may calculate a corresponding threshold factor according to the area signal and a preset false alarm probability value. The calculation formula of the threshold factor can be as follows:

$$a = N(P_{fa}^{-1/N} - 1))$$

Wherein, a represents the threshold factor, N represents the number of signal points and P fa represents the probability of false alarm.

After calculating the noise power and the threshold factor, the computer apparatus may calculate the signal threshold corresponding to the decoded signal according to the noise power and the threshold factor. The calculation formula of the signal threshold is as follows:

$$T = aPa$$

Wherein, T represents the signal threshold, a represents the threshold factor, Pn represents the noise power.

In this embodiment, the computer apparatus can dynamically calculate the signal threshold according to the environmental noise of the decoded signal to perform signal detection, thereby effectively improving the adaptability of the lidar under different environmental noises, while improving the detection accuracy of the lidar.

It should be understood that although the steps in the flowcharts of FIGS. 1-4 are displayed in order according to the arrows, the steps are not necessarily executed in the order indicated by the arrows. Unless clearly stated in this text, the execution of these steps is not strictly limited in order, and these steps can be executed in other orders. Moreover, at least a part of the steps in FIGS. 1-4 may include multiple sub-steps or multiple stages. These sub-steps or stages are not necessarily executed at the same time, and may be executed at different times. The sequential order for execution of these sub-steps or stages is not necessarily sequential, but may be executed in turn or alternately with at least a part of other steps or sub-steps or stages of other steps.

Figure 5:
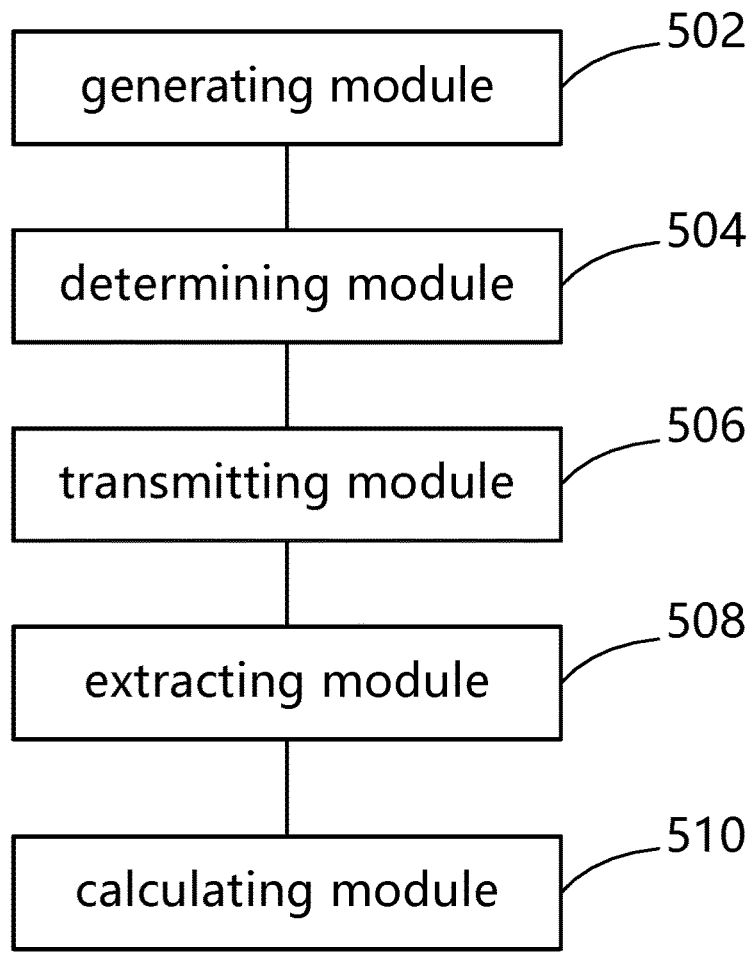
FIG. 5 is a block diagram of a lidar ranging device according to one or more embodiments.

In one of the embodiments, as shown in FIG. 5, a lidar ranging device is provided, comprising: a generating module 502, a determining module 504, a transmitting module 506, an extracting module 508, and a calculating module 510, wherein:

The generating module 502 is configured for calling a sequencer to generate a preset sequence with the sequencer.

The determining module 504 is configured for determining a pulse transmission interval of double pulses according to the preset sequence and a preset value.

The transmitting module 506 is configured for transmitting a probing signal to an object to be ranged according to the pulse transmission interval of the double pulses.

The extracting module 508 is configured for receiving, from the object to be ranged, an echo signal returned according to the probing signal, and extracting a valid echo signal from the echo signal.

The calculating module 510 is configured for calculating a distance from the object to be ranged according to a time difference between the valid echo signal and the probing signal.

In one of the embodiments, the determining module 504 is further configured for: calculating a frequency hopping sequence corresponding to the preset sequence according to the preset sequence and the preset value; dividing a time range of the double pulses into a plurality of transmission time intervals according to the preset sequence; and selecting a pulse transmission interval of double pulses from the plurality of transmission time intervals according to the preset sequence.

In one of the embodiments, the determining module 504 is further configured for: determining a pulse transmission time of the double pulses according to the preset sequence and the pulse transmission interval of the double pulses; and transmitting a probing signal according to the pulse transmission time of the double pulses.

In one of the embodiments, the extracting module 508 is further configured to identify the pulse transmission interval corresponding to the probing signal from the echo signal; decoding the echo signal according to the pulse transmission interval corresponding to the probing signal, to acquire a decoded signal; and performing signal detection on the decoded signal to acquire the valid echo signal.

In one of the embodiments, the extracting module 508 is further configured for performing analog-to-digital conversion of the echo signal to acquire a corresponding digital signal; caching the digital signal; extracting a digital signal from a preset neighborhood when a number of cached digital signals reaches a preset number; performing a non-coherent integration on the extracted digital signal, outputting an integrated digital signal; and identifying the valid echo signal from the integrated digital signal.

In one of the embodiments, the extracting module 508 is further configured for storing the decoded signal in a preset queue; extracting a signal to be inputted from the preset queue and inputting it to a buffer area; selecting an area signal from the buffer area according to a preset area; calculating a signal threshold corresponding to the decoded signal according to the area signal; comparing the decoded signal with the signal threshold to acquire a comparison result; and selecting from the comparison result a decoded signal larger than the signal threshold as the valid echo signal.

In one of the embodiments, the extracting module 508 is further configured for calculating, according to the area signal, a corresponding noise power; calculating, according to the area signal and a preset false alarm probability value, a corresponding threshold factor; and calculating the signal threshold corresponding to the decoded signal according to the noise power and the threshold factor.

For the specific definition of the lidar ranging device, please refer to the above definition of the lidar ranging method, which will not be repeated here. Each module in the above-mentioned lidar ranging device may be implemented in whole or in part by software, hardware, and a combination thereof. The above modules may be embedded in or independent of the processor in the computer device in the form of hardware, or may be stored in the memory of the computer device in the form of software, so that the processor can call and execute the operations corresponding to the above modules.

Figure 6:
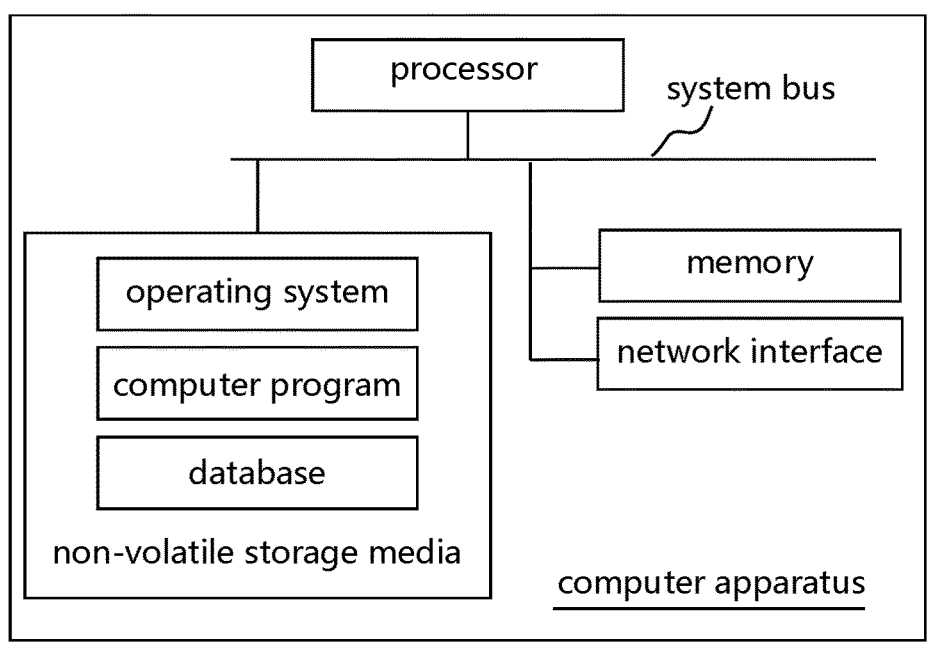
FIG. 6 is a block diagram of computer apparatus according to one or more embodiments.

In one embodiment, computer apparatus is provided, and its internal structure diagram may be as shown in FIG. 6. The computer apparatus comprises a processor, memory, communication interface, and database connected by a system bus. Wherein, the processor of the computer apparatus is configured to provide computing and control capabilities. The memory of the computer apparatus comprises a non-volatile storage medium and an internal memory. The non-volatile storage medium stores an operating system, computer-readable instructions, and a database. The internal memory provides an environment for the operation of the operating system and computer-readable instructions in the non-volatile storage medium. The database of the computer apparatus is configured to store probing signals and valid echo signals. The communication interface of the computer apparatus is configured for connecting and communicating with the lidar. The computer readable instructions are executed by the processor to implement a lidar ranging method.

Those skilled in the art can understand that the structure shown in FIG. 6 is only a block diagram of a part of the structure related to the solution of the present application, and does not constitute a limitation on the computer apparatus to which the solution of the present application is applied. The specific computer apparatus may comprise more or less components than shown in the figure, or combine certain components, or have a different arrangement of components.

There is provided one or more non-volatile computer-readable storage media storing computer-readable instructions, wherein, when the computer-readable instructions are executed by one or more processors, the one or more processors implement the steps in the foregoing method embodiments.

Those skilled in the art may understand that all or part of the process in the method of the foregoing embodiments may be completed by instructing relevant hardware through computer-readable instructions, and the computer-readable instructions may be stored in a non-volatile computer readable storage medium, when the computer-readable instructions are executed, the processes of the foregoing method embodiments may be included. Wherein, any reference to the memory, storage, database or other media used in the embodiments provided in the present application may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory can include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain (Synchlink) DRAM (SLDRAM), memory bus (Rambus) direct RAM (RDRAM), direct memory bus dynamic RAM (DRDRAM), and memory bus dynamic RAM (RDRAM), etc.

The technical features of the above embodiments can be arbitrarily combined. In order to simplify the description, all possible combinations of the technical features in the above embodiments are not described. However, as long as there is no contradiction in the combination of these technical features, it should be considered as the scope described in this specification.

The above-mentioned embodiments only express several implementations of the present application, and their descriptions are more specific and detailed, but they should not be understood as limiting the scope of the invention patent. It should be noted that, for those of ordinary skill in the art, without departing from the concept of the present application, a number of modifications and improvements can also be made, which all fall within the protection scope of the present application. Therefore, the protection scope of the patent of this application shall be subject to the appended claims.

The invention claimed is:

1. A lidar ranging method, comprising:
    calling a sequencer to generate a preset sequence with the sequencer;
    determining a pulse transmission interval between successive pairs of double pulses according to the preset sequence and a preset value;
    transmitting a signal to an object to be ranged according to the pulse transmission interval between the successive pairs of the double pulses;
    receiving, from the object to be ranged, a reflected signal returned according to the transmitted signal;
    extracting a valid echo signal from the reflected signal; and
    calculating a distance from the object to be ranged according to a time difference between the valid reflected signal and the transmitted signal,
    wherein said determining the pulse transmission interval between the successive pairs of double pulses according to the preset sequence and a preset value comprises:
    calculating a frequency hopping sequence corresponding to the preset sequence according to the preset sequence and the preset value;
    dividing a time range of the successive pairs of the double pulses into a plurality of transmission time intervals according to the preset sequence; and
    selecting the pulse transmission interval between the successive pairs of the double pulses from the plurality of transmission time intervals according to the frequency hopping sequence.

2. The method of claim 1, wherein said transmitting the transmitted signal to the object to be ranged according to the pulse transmission interval between the successive pairs of the double pulses comprises:
    calculating a pulse transmission time of the double pulses according to the preset sequence and the pulse transmission interval between the successive pairs of the double pulses; and
    transmitting the transmitted signal to the object to be ranged according to the pulse transmission time of the double pulses.

3. The method of claim 1, wherein said extracting the valid reflected signal from the reflected signal comprises:
    performing analog-to-digital conversion of the reflected signal to acquire a corresponding digital signal;
    caching the digital signal; extracting a digital signal from a preset neighborhood when a number of cached digital signals reaches a preset number;
    performing a non-coherent integration on an extracted digital signal; outputting an integrated digital signal; and
    identifying the valid reflected signal from the integrated digital signal.

4. The method of claim 1, wherein said extracting the valid reflected signal from the reflected signal further comprises:
    identifying, from the reflected signal, a pulse transmission interval corresponding to the transmitted signal;
    decoding the reflected signal according to the pulse transmission interval corresponding to the transmitted signal, to acquire a decoded signal; and
    performing signal detection on the decoded signal, to acquire the valid reflected signal.

5. The method of claim 4, wherein performing signal detection on the decoded signal comprises:
    storing the decoded signal in a preset queue;
    extracting a signal to be inputted from the preset queue and inputting it to a buffer area;
    selecting a first signal from the buffer area according to a preset area;
    calculating a signal threshold corresponding to the decoded signal according to the first signal;
    comparing the decoded signal with the signal threshold to acquire a comparison result; and
    selecting from the comparison result a decoded signal larger than the signal threshold as the valid reflected signal.

6. The method of claim 5, wherein said calculating a signal threshold corresponding to the decoded signal according to the first signal comprises:
    calculating, according to the first signal, a corresponding noise power;
    calculating, according to the first signal and a preset false alarm probability value, a corresponding threshold factor; and
    calculating the signal threshold corresponding to the decoded signal according to the noise power and the threshold factor.

7. A lidar ranging device, comprising:
    a memory having computer-readable instructions stored thereon; and
    one or more processors;
    wherein the computer-readable instructions, when being executed by the one or more processors, cause the one or more processors to perform:
    calling a sequencer to generate a preset sequence with the sequencer;
    determining a pulse transmission interval between the successive pairs of double pulses according to the preset sequence and a preset value;
    transmitting a signal to an object to be ranged according to the pulse transmission interval between the successive pairs of the double pulses;
    receiving, from the object to be ranged, a reflected signal returned according to the transmitted signal;
    extracting a valid reflected signal from the reflected signal; and
    calculating a distance from the object to be ranged according to a time difference between the valid reflected signal and the transmitted signal,
    wherein said determining a pulse transmission interval between the successive pairs of double pulses according to the preset sequence and a preset value comprises:
    calculating a frequency hopping sequence corresponding to the preset sequence according to the preset sequence and the preset value;
    dividing a time range of the double pulses into a plurality of transmission time intervals according to the preset sequence; and selecting the pulse transmission interval between the successive pairs of the double pulses from the plurality of transmission time intervals according to the frequency hopping sequence.

8. The device of claim 7, wherein the computer-readable instructions, when being executed by the one or more processors, further cause the one or more processors to perform:
calculating a pulse transmission time of the double pulses according to the preset sequence and the pulse transmission interval between the successive pairs of the double pulses; and
transmitting the transmitted signal according to the pulse transmission time of the double pulses.

9. The device of claim 7, wherein the computer-readable instructions, when being executed by the one or more processors, further cause the one or more processors to perform:
performing analog-to-digital conversion of the reflected signal to acquire a corresponding digital signal; caching the digital signal;
extracting a digital signal from a preset neighborhood when a number of cached digital signals reaches a preset number;
performing a non-coherent integration on the extracted digital signal, outputting an integrated digital signal; and
identifying the valid reflected signal from the integrated digital signal.

10. The device of claim 7, wherein the computer-readable instructions, when being executed by the one or more processors, further cause the one or more processors to perform:
identifying, from the reflected signal, a pulse transmission interval corresponding to the transmitted signal;
decoding the reflected signal according to the pulse transmission interval corresponding to the transmitted signal, to acquire a decoded signal; and
performing signal detection on the decoded signal to acquire the valid reflected signal.

11. The device of claim 10, wherein the computer-readable instructions, when being executed by the one or more processors, further cause the one or more processors to perform:
storing the decoded signal in a preset queue; extracting a signal to be inputted from the preset queue and inputting it to a buffer area;
selecting a first signal from the buffer area according to a preset area;
calculating a signal threshold corresponding to the decoded signal according to the first signal;
comparing the decoded signal with the signal threshold to acquire a comparison result; and
selecting from the comparison result a decoded signal larger than the signal threshold as the valid reflected signal.

12. The device of claim 11, wherein the computer-readable instructions, when being executed by the one or more processors, further cause the one or more processors to perform:
calculating, according to the first signal, a corresponding noise power;
calculating, according to the first signal and a preset false alarm probability value, a corresponding threshold factor; and
calculating the signal threshold corresponding to the decoded signal according to the noise power and the threshold factor.

13. One or more non-volatile computer-readable storage media having computer-readable instructions stored thereon, wherein the computer-readable instructions, when being executed by one or more processors, cause the one or more processors to perform:
calling a sequencer to generate a preset sequence with the sequencer;
determining a pulse transmission interval between the successive pairs of double pulses according to the preset sequence and a preset value;
transmitting a signal to an object to be ranged according to the pulse transmission interval between the successive pairs of the double pulses;
receiving, from the object to be ranged, a reflected signal returned according to the transmitted signal;
extracting a valid reflected signal from the reflected signal; and
calculating a distance from the object to be ranged according to a time difference between the valid reflected signal and the transmitted signal,
wherein said determining a pulse transmission interval between the successive pairs of double pulses according to the preset sequence and a preset value comprises:
calculating a frequency hopping sequence corresponding to the preset sequence according to the preset sequence and the preset value;
dividing a time range of the double pulses into a plurality of transmission time intervals according to the preset sequence; and
selecting the pulse transmission interval between the successive pairs of the double pulses from the plurality of transmission time intervals according to the frequency hopping sequence.

14. The non-volatile computer-readable storage media of claim 13, wherein said transmitting the transmitted signal to the object to be ranged according to the pulse transmission interval between the successive pairs of the double pulses comprises:
calculating a pulse transmission time of the double pulses according to the preset sequence and the pulse transmission interval between the successive pairs of the double pulses; and
transmitting the transmitted signal to the object to be ranged according to the pulse transmission time of the double pulses.

15. The non-volatile computer-readable storage media of claim 13, wherein said extracting the valid reflected signal from the reflected signal comprises:
performing analog-to-digital conversion of the reflected signal to acquire a corresponding digital signal;
caching the digital signal; extracting a digital signal from a preset neighborhood when a number of cached digital signals reaches a preset number;
performing a non-coherent integration on an extracted digital signal; outputting an integrated digital signal; and
identifying the valid reflected signal from the integrated digital signal.

16. The non-volatile computer-readable storage media of claim 13, wherein said extracting the valid reflected signal from the reflected signal further comprises:
identifying, from the reflected signal, a pulse transmission interval corresponding to the transmitted signal;

decoding the reflected signal according to the pulse transmission interval corresponding to the transmitted signal, to acquire a decoded signal; and performing signal detection on the decoded signal, to acquire the valid reflected signal.

17. The non-volatile computer-readable storage media of claim 16, wherein performing signal detection on the decoded signal comprises:

storing the decoded signal in a preset queue;

extracting a signal to be inputted from the preset queue and inputting it to a buffer area;

selecting a first signal from the buffer area according to a preset area;

calculating a signal threshold corresponding to the decoded signal according to the first signal;

comparing the decoded signal with the signal threshold to acquire a comparison result; and selecting from the comparison result a decoded signal larger than the signal threshold as the valid reflected signal.

* * * * *